(12) United States Patent
Gautama et al.

(10) Patent No.: US 9,171,485 B2
(45) Date of Patent: Oct. 27, 2015

(54) GEODATABASE INFORMATION PROCESSING

(75) Inventors: Sidharta Gautama, Ghent (BE); Rik Bellens, Ghent (BE)

(73) Assignee: UNIVERSITEIT GENT, Ghent (BE)

( * ) Notice: Subject to any disclaimer, the term of this patent is extended or adjusted under 35 U.S.C. 154(b) by 1009 days.

(21) Appl. No.: 13/145,363

(22) PCT Filed: Jan. 20, 2010

(86) PCT No.: PCT/EP2010/050654
§ 371 (c)(1),
(2), (4) Date: Jul. 20, 2011

(87) PCT Pub. No.: WO2010/084139
PCT Pub. Date: Jul. 29, 2010

(65) Prior Publication Data
US 2011/0276592 A1    Nov. 10, 2011

Related U.S. Application Data

(60) Provisional application No. 61/146,071, filed on Jan. 21, 2009.

(51) Int. Cl.
*G06F 17/30* (2006.01)
*G09B 29/10* (2006.01)
*G01C 21/32* (2006.01)

(52) U.S. Cl.
CPC .............. *G09B 29/106* (2013.01); *G01C 21/32* (2013.01)

(58) Field of Classification Search
CPC . G01C 21/32; G09B 29/106; G06F 17/30241
See application file for complete search history.

(56) References Cited

U.S. PATENT DOCUMENTS

| 2003/0076777 | A1* | 4/2003 | Stuber et al. | 370/206 |
| 2007/0142989 | A1 | 6/2007 | Koehrsen et al. | |
| 2007/0253642 | A1* | 11/2007 | Berrill et al. | 382/305 |
| 2008/0306969 | A1* | 12/2008 | Mehta et al. | 707/10 |

FOREIGN PATENT DOCUMENTS

WO    2007010317    1/2007

OTHER PUBLICATIONS

Chen Chen et al., Roads Digital Map Generation With Multi-Track GPS Data, Dec. 21, 2008, 2008 International Workshop on Education Technology and Training and 2008 International Workshop on Geoscience and Remote Sensing, pp. 508-511.
Heiner Ackermann et al., GPS-Route, Internet Citation, Dec. 2, 2008, p. 82PP, XP007912901.
Tao Guo et al., Towards High Accuracy Road Maps Generation From Massive GPS Traces Data, Jan. 1, 2008, Geoscience and Remote Sensing Symposium, 2007. Igarss 2007, pp. 667-670.
International Search Report of PCT/EP2010/050654 dated May 18, 2010.

* cited by examiner

*Primary Examiner* — Dinku Gebresenbet
(74) *Attorney, Agent, or Firm* — Bacon & Thomas, PLLC (57) ABSTRACT

A system is described for processing data of at least one location aware devices for obtaining geo-information. The system comprises an input means for obtaining vector-based data from at least one location aware devices, a data processor for inserting information from the vector-based data into a raster-based data structure so as to derive geo-information based on the raster-based data structure. A corresponding method as well as corresponding computer program products also are described.

18 Claims, 8 Drawing Sheets

| x | y | z | T | F1 | F2 |
|---|---|---|---|----|----|
| 1 | 1 | 1 | 1 |    |    |
| 2 | 1 | 1 | 1 |    |    |
| ... |   |   |   |    |    |
| Nx | 1 | 1 | 1 |    |    |
| 1 | 2 | 1 | 1 |    |    |
| 2 | 2 | 1 | 1 |    |    |
| ... |   |   |   |    |    |
| Nx | Ny | Nz | Nt |   |    |

FIG. 5

| X | Y | N |
|---|---|---|
| 1 | 1 | |
| 2 | 1 | |
| ... | | |
| Nx | 1 | |
| 1 | 2 | |
| 2 | 2 | |
| ... | | |
| Nx | Ny | |

FIG. 6

| x | y | v1 | v2 | v3 |
|---|---|----|----|----|
| 1 | 1 | | | |
| 2 | 1 | | | |
| ... | | | | |
| Nx | 1 | | | |
| 1 | 2 | | | |
| 2 | 2 | | | |
| ... | | | | |
| Nx | Ny | | | |

FIG. 7

| x | y | T | v1 | v2 | v3 |
|---|---|---|----|----|----|
| 1 | 1 | 1 | | | |
| 2 | 1 | 1 | | | |
| ... | | | | | |
| Nx | 1 | 1 | | | |
| 1 | 2 | 1 | | | |
| 2 | 2 | 1 | | | |
| ... | | | | | |
| Nx | Ny | 24 | | | |

GEODATABASE INFORMATION PROCESSING

FIELD OF THE INVENTION

The invention relates to the field of processing of geodatabase information. More particularly, the present invention relates to methods and systems for processing information for geodatabases or for updating and/or extending geodatabase information obtainable from location aware devices.

BACKGROUND OF THE INVENTION

In order to check, adjust, extend or more generally improve geographic information systems, use is made of information captured from location aware devices, such as global positioning systems and collected at a central system. Such data is often referred to as floating car data (FCD) coming from so-called probe-vehicles, i.e. vehicles that are equipped with the necessary devices to transmit data to a data center at regular time intervals. The data comprises information on the status of the vehicle, for instance its location and speed. In the data center the data are processed in order to make them useable. The accuracy of the data depends on the frequency of the positioning and broadcasting of the data, the accuracy of the GPS and the number of probe-vehicles. Based on this data, different traffic related information can be derived. Some examples are discussed below In the Netherlands, the Ministry of Transport, Public Works and Water Management (Ministerie van Verkeer en Waterstaat) has carried out an experiment with FCD. The purpose of this experiment was to investigate the usefulness of FCD and to get an understanding of the possibilities and problems with FCD. The experiment was part of a large innovation research program called "Roads to the Future". Approximately 60 vehicles in the city of Rotterdam were equipped with GPS and GSM devices and the data were used to estimate travel times. After the data had been filtered, about 75% of all the measurements could be used to estimate the travel times. The accuracy of the estimated travel times lies within 1% of the actual travel times for relatively larger road sections.

FCD is used in the production and maintenance of road network databases. This production process requires a lot of work and resources. Furthermore, the current digital networks have an inherent static nature while the real road networks are dynamic by nature—new roads are built and old ones reconstructed. Temporary changes such as road works and accidents also influence the network. In order to overcome this problem, it was suggested to use an algorithm that derives road networks from FCD. The idea behind this is: "where there are vehicles, there must be a road".

A complete prototype system is known that uses FCD for both automatic and manual detection of queues in traffic. The system consists of small hardware units placed in mobile traffic report units (taxis were used) and backstage databases that collect all the data from the report units. The automatic detection was based on analyzing GPS data from the taxis. The manual detection was based on taxi drivers reporting traffic queues by using the equipment in the taxis. A one-month field test, where 10 taxis were used, showed that the system is operational and that the communication costs are very low. The field test also provoked new questions, such as how many taxis are needed to do real-time queue detection, how to combine automatic and manual queue detection, and how to integrate the FCD with existing queue detection systems.

Systems using FCD to calculate detailed routes and travel times for hazardous goods transport in the Austrian road network also are known. Furthermore the FCD are used to calculate historical time series and actual travel times.

The current state of the art systems and methods are based on vector processing of probe track geometries. This information is to be coupled to existing digital maps, representing the centerline geometry of a road segment as a widely spaced sequence of latitude and longitude vector points connected by line segments. Geometry also may be represented as a sequence of points, adding estimated standard deviations for longitude and latitude as a vector attribute to represent confidence in the point. Connecting the points by linear interpolation is sufficient for low-curvature tracks, but for roads with higher curvature higher-order interpolation is possible (e.g. spline representation).

SUMMARY OF THE INVENTION

It is an object of embodiments of the present invention to provide good systems and/or methods for processing information for geodatabases, e.g. for updating and/or extending geodatabases with geo-information. It is an advantage of embodiments of the present invention that good systems and/or methods are provided for processing, including updating and/or extending, geo-information by processing data, e.g. track data, collected from a plurality of location aware devices. It is an advantage of embodiments according to the present invention that efficient methods and systems are obtained for updating and extending geo-databases based on data from a plurality of location aware devices. The efficiency may be sufficient to accurately process data in real-time or without significant delay. It is an advantage of embodiments according to the present invention that a raster-based data structure, i.e. a raster-based representation, is used for processing vector-based data from a plurality of location aware devices for obtaining geo-information. It is an advantage of embodiments according to the present invention that a raster based representation is used for processing the data from the plurality of location aware devices, as this allows overcoming differences in scale, sample density and vector type between data in the geodatabases and data available from or through the plurality of location aware devices. According to embodiments of the present invention, the methods and/or systems may exploit a constant unit aspect of a raster-based representation for overcoming differences in scale, sample density and vector type.

The raster-based representation may be a multidimensional space-time matrix representation. Alternatively, implicit space-time matrix representations, such as for example raster-based representations from which an explicit space and time matrix representation can be determined using a transformation also may be used. Track and/or source data of the plurality of location aware devices may be partitioned in space-time cells.

The above objective is accomplished by a method and device according to the present invention.

The present invention relates to a system for processing data of at least one location aware device for obtaining geo-information, the system comprising an input means for obtaining a plurality of vector-based data from at least one location aware device and a data processor adapted for inserting information from the vector-based data into a raster-based data structure, the data processor being adapted for deriving geo-information based on the raster-based data structure and on the information from the plurality of vector-based data inserted therein. It is an advantage of embodiments of the present invention that by using a raster-based data structure, more efficient processing of information and/or deriving or geo-information may be obtained.

The raster-based data structure may comprise a plurality of data container elements corresponding with topologically arranged locations and the data processor may comprise a data voting unit adapted for adding the information from the vector-based data to selected data container elements. The data container elements corresponding with topologically arranged locations, i.e. topologically arranged geo-locations or positions, may be topologically arranged data container elements.

The data voting unit may be adapted for adding the information from the vector-based data individually to the selected data container elements. The data elements may be referred to as data container elements as the data element may be used for containing information from a plurality of vector-based data that provide a contribution for that topological position.

The data processor may be adapted for updating a counter or frequency of the selected data container elements based on the information from the vector-based data.

The data processor may be adapted for updating the raster-based data structure incrementally with the information from the vector-based data.

The data processor may be adapted for deriving geo-information based on the coupling between the content of data container elements corresponding with topologically arranged neighbouring locations.

The data processor may comprise an indexing means adapted for indexing a spatial location component of the vector-based data. It is an advantage of embodiments according to the present invention that processing of the information can make use of an easy indexing technique.

The data processor may be adapted for inserting the information of the vector-based data into the raster-based data structure taking into account the obtained index of said spatial location component. It is an advantage of embodiments according to the present invention that the spatial properties of the data are inherently included in the representation, allowing for efficient processing in the field of geographic information systems.

The system may be adapted for obtaining traffic and/or road related geo-information, the geo-information being information that refers to or is linked to location.

The system furthermore may comprise an output means for outputting the raster-based data structure for storage to a database. It is an advantage of embodiments of the present invention that storing the raster-based data structure allows for not storing the vector-based data, as the information is embedded in the raster-based data structure anyway.

The system may be adapted for receiving data from a plurality of location aware devices. It is an advantage of embodiments of the present invention that these allow accurate combination of data of a plurality of location aware devices by using raster-based representation.

The data processor may be adapted for inserting the vector-based data into a space-time matrix data structure. Such a space-time matrix structure may be implict or explicit. An implicit space-time matrix structure may be a raster-based representation from which an explicit space and time matrix representation can be determined using a transformation. It is an advantage of embodiments according to the present invention that a representation can be used allowing easy mathematical processing. The data processor may comprise a deriving means for deriving geo-information based on the raster-based data structure. The data processor may comprise a deriving means adapted for deriving geo-information being a new road geometry.

The deriving means may comprise a neural network or reservoir computing unit for deriving said geo-information.

The deriving means may comprise a unit for performing data-mining for deriving said geo-information.

The data processor may be adapted for deriving occurrence for deriving traffic and/or road related information based on the raster-based representation.

The data processor may be adapted for deriving co-occurrence attributes for deriving traffic and/or road related information based on the raster-based representation.

The input means may be adapted for receiving data comprising a location component and at least two attributes, and the data processor may be adapted for deriving geo-information based on the at least two attributes using a same location component of the raster-based data structure. The system may be adapted for updating and/or extending an existing geo-database.

The system furthermore may comprise a matching unit for matching the obtained geo-information to vector-based data of an existing geo-database.

The system furthermore may comprise a matching unit for matching the obtained geo-information to a raster-based representation of vector-based data in an existing geo-database. The geo-information may be an average track or attributes, thus allowing to match the existing geo-database directly with derived geo-information rather than with individual probe tracks.

The system furthermore may comprise a matching unit for matching obtained geo-information between a plurality of location aware devices. The data processor may comprise different processing units, whereby one of the processing units is a processing unit present in or at the at least one location aware device, whereas another part of the processing unit is centralized for a plurality or all of the at least one location aware devices used.

The processor may comprise at least one processing component implemented on the location aware device. The at least one processing component may be adapted for processing the vector-based location data into raster-based data.

The present invention also relates to a method for processing data of at least one location aware device for obtaining geo-information, the method comprising obtaining a plurality of vector-based data from at least one location aware device, and inserting information of the plurality of vector-based data into a raster-based data structure so as to derive geo-information based on the raster-based data structure. The method furthermore may comprise steps expressing the functionality of the components of a system as described above. The method may for example be adapted for distributed processing, wherein part of the inserting information is performed by processing data in processing units localized at the at least one location aware devices, transmitting the partly processed data to a central processing unit and further processing the data in the central processing unit.

The method may be implemented as a computer program product, the method being performed when the computer program product is executed on a computing device. The present invention also relates to a computer program product for, when executed on a computing device, performing a method comprising obtaining a plurality of vector-based data from at least one location aware devices, and inserting information of the vector-based data into a raster-based data structure so as to derive geo-information based on the raster-based data structure. The computer program product furthermore may be adapted for, when executed on a computing device, performing steps expressing the functionality of the components of a system as described above.

The present invention also relates to a data carrier comprising a computer program product as described above and/or to the transmission of such a computer program product over a network It is an advantage of embodiments according to the present invention thatdata mining of a plurality of tracks for deriving extended database attributes may be performed in an efficient way. The latter may for example be obtained by any or more of recording per cell the frequency of occurrence, the speed, the time and/or the orientation.

It is an advantage of embodiments according to the present invention that methods and systems may impose spatial or spatial and time clustering on the processing due to the inherent arrangement of the raster-based representation, resulting in the possibility of fast indexing and processing of further data.

The present invention also relates to a computer program product or computer application for executing on a location aware device, the computer program product or computer application being adapted for, when executed on the location aware device, processing vector-based data into raster-based data on the location aware device and for submitting the raster-based data, e.g. to a server storing raster-based data. The raster-based data may comprise a raster-based index, e.g. representative of an element of the raster. The raster based data may be compressed raster-based data. The computer program product or computer application may be implemented on a location aware device. The computer program product or computer application may be implemented on a mobile phone.

The present invention also relates to a location aware device, the location aware device comprising an application, adapted for, when executed on the location aware device, processing vector-based data into raster-based data on the location aware device and for submitting the raster-based data, e.g. to a server storing raster-based data. The raster-based data may comprise a raster-based index, e.g. representative of an element of the raster.

The present invention also relates to a data carrier comprising a computer program product or application as described above and/or to the transmission of such a computer program product or application over a network.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes.

Any reference signs in the claims shall not be construed as limiting the scope. In the different drawings, the same reference signs refer to the same or analogous elements.

DETAILED DESCRIPTION OF ILLUSTRATIVE EMBODIMENTS

While the invention is illustrated and described in detail in the drawings and accompagnying description, such illustration and description are to be considered illustrative or exemplary and not restrictive. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims. Alternatively or in addition thereto a function of an item also may be performed by a plurality of processors. The mere fact that certain measures are recited in mutually different dependent claims does not indicate that a combination of these measures cannot be used to advantage.

The following description details certain embodiments of the invention. It will be appreciated, however, that no matter how detailed it appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

Where in embodiments of the present invention reference is made to geographic information system (GIS), reference may be made to a system for capturing, storing, analyzing, managing, processing or presenting data that refers to or is linked to location. It may include any information system that integrates, stores, edits, processes, analyses, shares or displays geographically related information. Where in embodiments of the present invention reference is made to geo-information, reference can be made to information that refers to or is linked to location.

Where in embodiments of the present invention reference is made to raster-based, this may be embodied by a representation using elements corresponding with topologically arranged positions, for example topologically arranged elements, such as for example a representation using a matrix, a raster, an image, etc. where the topological position of the element is implicit in the ordering of the elements or whereby the topological ordering is implicit and can be made explicit using a transformation. Whereas for reasons of convenience, the raster-based representation used for illustrating aspects of the present invention is based on matrix representation, embodiments of the present invention thus are not limited thereto and can be embodied by all representations using topologically arranged elements. Where in embodiments of the present invention reference is made to "topologically arranged", reference is made to an arrangement of elements, data or locations describing the elements, data or locations with respect to their physical layout in the arrangement. For data or elements, this does not not necessarily need to refer to their physical location. "Topologically arranged elements" refers to a description of elements providing an identification of what elements are neighbouring or directly connected to the described element, rather than to their exact physical location. This stands in contrast to a vector-based representation where topology must be stored explicitly.

In a first aspect, the present invention relates to a system for processing data of at least one location aware device for obtaining geo-information. Geo information thereby may be information that refers to or is linked to location. The methods and systems may be especially suitable for processing traffic related and/or road-related geo-information, such as for example new road geometry, traffic jam information, speed information, information suitable for adapting drive behavior of a vehicle, etc. The system according to embodiments of the present invention comprises an input means for obtaining a plurality of vector-based data from at least one location aware device. Such a location aware device may for example be a global positioning system (GPS) as often mounted in a vehicle or a mobile phone traceable in position based on the radiation it receives from satellites. The location aware device may for example be a Global System for Mobile communication (GSM) traceable in position based on the closest base stations it contacts using a roaming signal. The location aware device may for example be a bluetooth, wireless networking or radio frequency identification device traceable in position based on signal strength and/or contact with base stations. Transmission of the location data can be done in real-time through a connection like a GSM or can be done off-line by making a connection through a PC and internet to upload historical data to a central server. The vector-based data may be generated by the location aware devices or may be generated by a central server receiving information about signal strength of the location aware devices. The data captured from location aware devices typically may be generated with an intention for processing, adjusting, checking, updating, extending or manipulating a geographic information. The location aware device may be programmed for automatically or automated submitting such vector-based data to the system. Alternatively or in addition thereto, the location aware device may be adapted so that a user can submit particular vector-based data, e.g. for example, in case a user wants to submit particular information regarding errors or changes in the geographic information system such as a change in traffic rules or a traffic situation. The system furthermore comprises a data processor for inserting information from the vector-based data of the at least one location aware device to a raster-based data structure or raster-based representation. A raster-based data structure or raster based representation of data thereby may be for example a matrix-based representation, a pixel-based representation, etc. Such data processing may be performed so as to derive geo-information based on the raster-based data structure. According to embodiments of the present invention, the data processor also may be explicitly adapted for deriving such geo-information. In some embodiments according to the present invention, the data processor may comprise a plurality of data processing units, such that at least part of the processing can be performed on the location aware device. The latter may result in fast and efficient communication of the position and movement so a to reduce bandwidth consumption and in fast processing on the side where the information is centralized, e.g. the server side, due to the distributed processing that can be performed.

Figure 1:
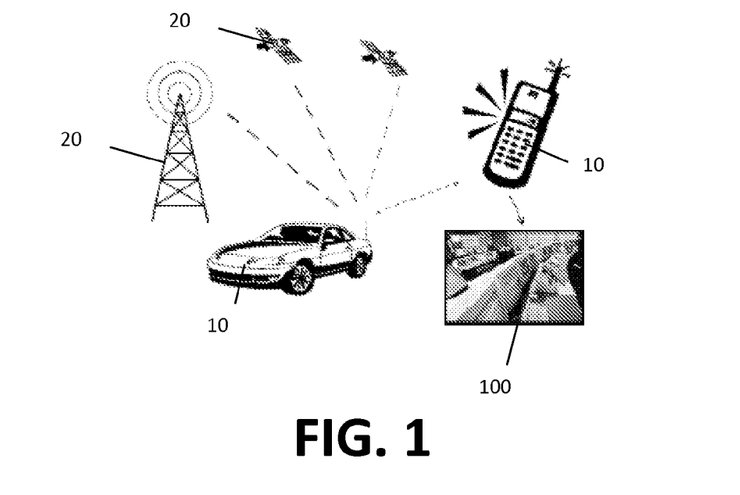
FIG. 1 shows an example of a setup of a a probe system for probing geodatabase information as can be used in embodiments according to the present invention.
Figure 2:
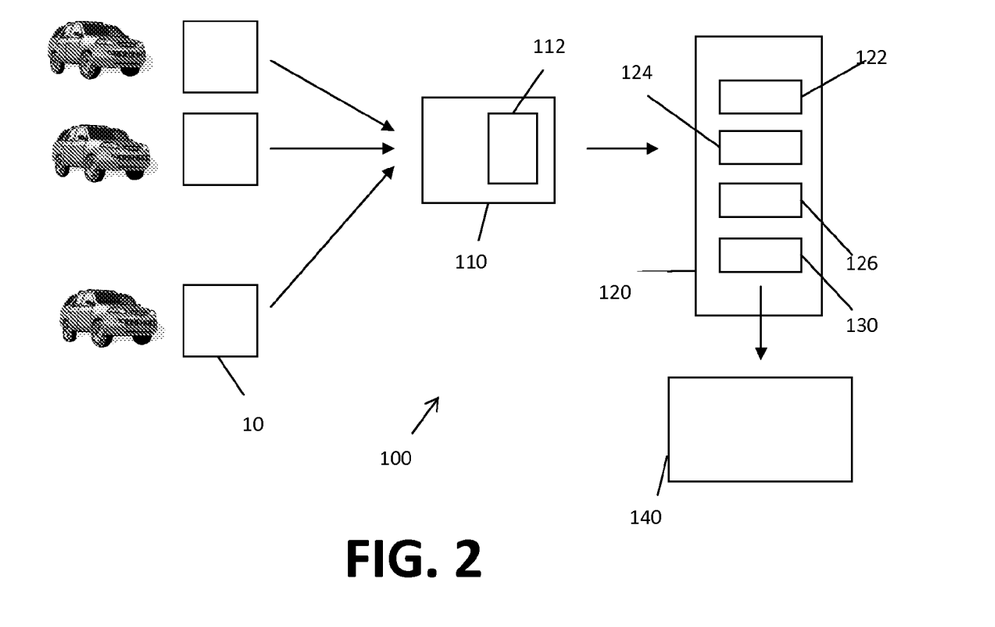
FIG. 2 shows an exemplary system for processing data for a geographic information system according to an embodiment of the present invention.

By way of illustration, a schematic representation of location aware devices 10, optional components of a transmission system 20 and a system for processing the obtained information 100 is shown in FIG. 1. By way of illustration, different standard and optional aspects of an exemplary system according to an embodiment, the present invention not being limited thereto, will be discussed in more detail with reference to FIG. 2.

Figure 3:
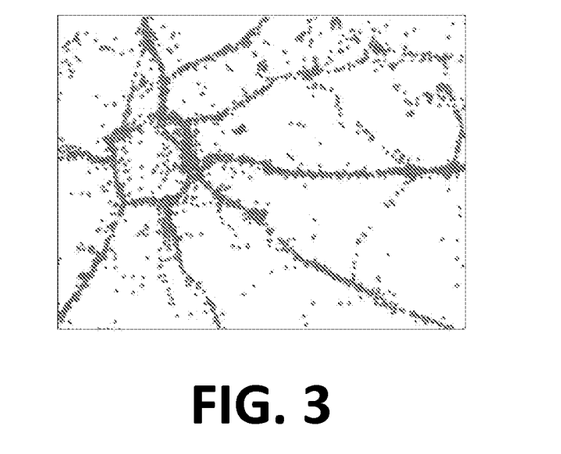
FIG. 3 shows a known illustration of a plurality of point locations of probe vehicles from where information can be sent, as can be used in embodiments according to the present invention.

As set out above, the system 100 comprises an input means 110 for obtaining vector-based data from at least one location aware device 10. Obtaining vector-based data may refer to the act of receiving the information in the system 100, although it also may comprise providing the information in the system 100. In the first case, the input means may for example only be an input port, through which previously or currently captured information is entered in the system, whereas in the latter case the input means 110 may actually be adapted for capturing the data. According to some embodiments, the input means 110 may thus for example comprise a plurality of receivers for capturing transmitted data, transmitted by the at least one location aware device 10. Advantageously, the system 100 is adapted for receiving vector-based data from a plurality of location aware devices 10, as the system is especially suitable for processing a plurality of data from a plurality of location aware devices 10. When receiving data from a plurality of devices, the obtained information can be more easily processed taken into account statistical analysis. By way of illustration FIG. 3 illustrates a map indicating positions of different location aware devices that may sent information to the system 100. The location aware devices 10, may for example be mounted in or on vehicles, such as for example GPS devices in a car, although the invention is not limited thereto. The location aware devices 10 may for example also be mobile telephone devices, whereby the radiation pattern with respect to different transmitters in the field allows to determine a location. The obtained data may be real-time data coming directly from the location aware devices or it may be historical data, based on earlier data is first stored, either on the location aware device or in a database in the system. The input means may comprise a memory 112 for temporarily storing data or for obtaining stored data to use it as input or for calculation further in the process. Data coming from the location aware devices may comprise location data, also referred to as position data. An example of such location data may be one or more of latitude, longitude or altitude of the position of the location aware device. Such location data also may be provided in an inherent manner to the system. In addition, additional attribute data may be sent. Such additional attribute data may for example comprise one or more of time, speed, orientation, change in speed, change in direction, etc. The latter may be correlated with a position of the at least one location aware device. Position data of a single vehicle is typically obtained as vector-based data. In advantageous embodiments, the obtained vector-based data comprises a plurality of vector point position measurements at given time or distance intervals, which may lead to a polyline representation, resulting in track information for the location aware device 10.

Figure 4:
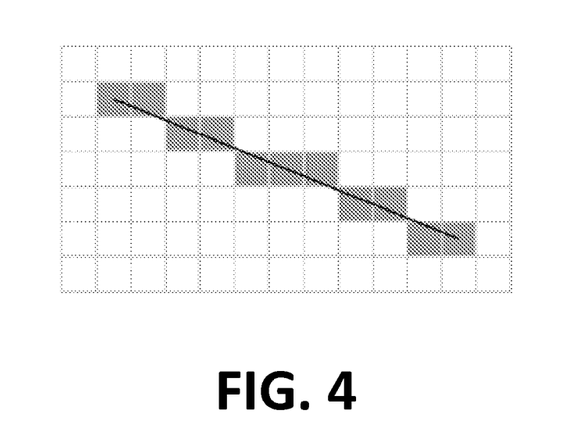
FIG. 4 is an illustration of the Bregenham vector to raster conversion algorithm as can be used in embodiments according to the present invention.

The system 100 according to embodiments of the present invention, furthermore comprises a data processor 120 for inserting information from the vector-based data into a raster-based data structure. Thus instead of retaining the vector-based representation, the system is adapted for using a raster-based data structure for embedding information of the vector-based data, i.e. for using a representation comprising a plurality of elements corresponding with topologically arranged locations of the scene of which geo-information is to be obtained (topologically arranged geo-locations or geo-positions). The elements may be themselves topologically arranged elements. The raster-based data structure may comprise a plurality of data container elements corresponding with topologically arranged locations. For insertion of the data, the data processor may for example comprise a data voting unit for adding the information from the vector-based data to selected topologically arranged data container elements. The insertion of the data into the raster-based data structure, i.e. the conversion of vector-based data to adapt to the raster-based data structure may be performed using any suitable technique. In one exemplary embodiment, the data processor 120 may insert the information by applying a vector-to-raster operation like the Bregenham algorithm to determine which element of the plurality of topologically arranged elements should be updated in order to form a close approximation to a straight line between two given points. The Bregenham algorithm is known, e.g. for drawing lines on a computer screen, as it uses only integer addition, subtraction and bit shifting all of which are very cheap operations in standard computer architectures. Other techniques for vector-to-raster operation exist and are applicable. Other techniques for converting vector-based information into the raster-based data structure may for example be Digital Differential Analyzer (DDA) and fast anti-aliasing. By way of example, an illustration of the Bregenham algorithm for transforming the vector-based data to raster based data is shown in FIG. 4.

According to embodiments of the present invention, the data processor 120 may for example be adapted for indexing a location component of the vector-based data, i.e. the part of the data expressing the spatial location. The data processor 120 therefore may comprise an indexing means 122 for indexing spatial location data from the vector-based data. In some embodiments, when a time component is available in the data and may be used in subsequent steps, the information insertion operation optionally also may be extended to take into account this time component in the data. An example where time may be taken into account is by linear interpolation of the time t1 and t2 given at start and end point of the line segment. This may then be combined to form an index expressing both spatial location and time, e.g. (x,y,z,t). The data processor 120 then further may be adapted for updating one or more topologically arranged elements of a raster based representation of data based on the obtained index. Such updating may be performed individually, i.e. the obtained vector-based data may be individually added to the raster-based data structure. The data processor 120 therefore may comprise an element updating unit 124 for selectively updating an element of the raster-based data structure representing information provided by the at least one attribute, e.g. occurrence or an attribute provided by the at least one location aware device. The latter thus may be performed taking into account a derived index expressing the spatial location or the spatial location and time. When, besides location or time and location, additional attributes are provided or known from the vector-based data, the updating may be performed taking into account the obtained index in combination with the attribute value for the attribute, e.g. a value for a speed, a direction, an acceleration or deceleration, an angular velocity, etc. The updating thus may be based at least on the obtained index e.g. on a combination of the obtained index with an additional attribute value of the attribute. If several attributes are provided by the location aware device at the same location or at the same time and location, several sets of raster based data may be updated or raster-based data combining a raster-based representation for the different attributes may be updated by updating the appropriate topologically arranged elements, based on the same index. Updating may be performed by adjusting a binary value, by adjusting an occurrence for a topologically arranged element, e.g. by adjusting a counter for a particular topologically arranged element, by adjusting a grey scale value of it, etc.

In some embodiments, the raster-based implementation thus may be a representation using raster-based indices being a group of indices representative of an implicit or explicit space-time matrix raster-based representation.

In some embodiments, in addition to attributes provided by the location aware device, the system can also calculate attribute values based on given data, such as for example based on any or more of location, time or other, provided, attributes. An example is the calculation of an attribute, e.g. speed or orientation, based on the position of the location aware device on time t and time t-s where s is the sample time. The device therefore may be equipped with a calculation unit 126 for calculating additional attributes.

In addition, the information insertion operation for insertion information of the vector-based data into the raster-based data structure can take into account the spatial accuracy of the data provided by the location aware device by indexing the data not as one cell but as several cells to reflect a quantity like standard deviation on position. The cells also can be indexed together with a weight, expressing a central position obtained by the location aware device or a position deviating from this central position. Such options may assist in a statistical processing of the obtained data.

The raster-based representation that may be used for inserting the data provided by the at least one location aware device, may for example be a matrix based representation, a pixel-based representation, . . . . The individual components of the raster-based representation may be referred to as elements, pixels, cells, etc. The number of dimensions may depend on the application that is envisaged, e.g. the number of attributes that is to be processed. The raster-based representation may be provided by a multidimensional matrix. The raster-based representation may be provided as a space matrix or as a space-time matrix. For illustration purposes, the present invention not being limited thereto, the raster-based representation used for illustration in the examples below is a multidimensional matrix representation.

Figure 5:
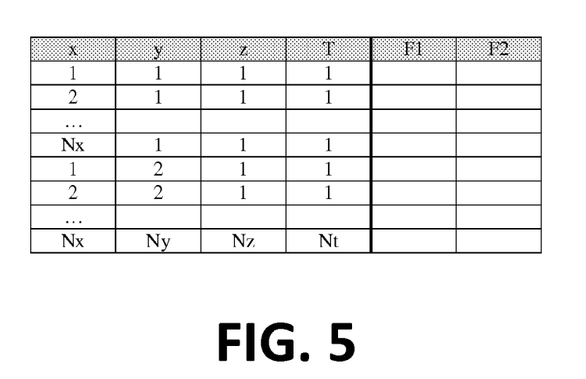
FIG. 5 to FIG. 8 show examples of time-space matrix representations for geodatabase information as can be used in embodiments according to the present invention.
Figure 6:
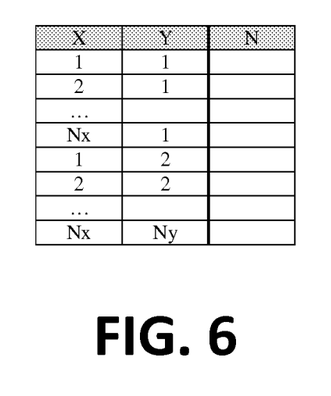
Figure 7:
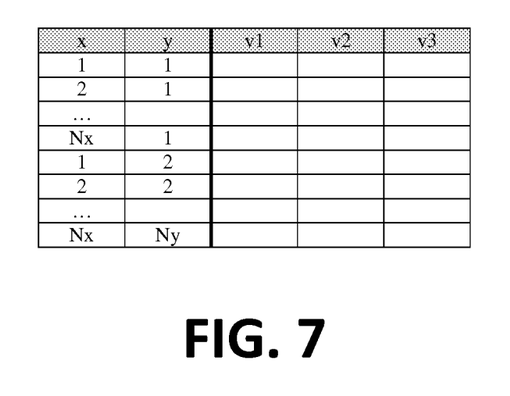
Figure 8:
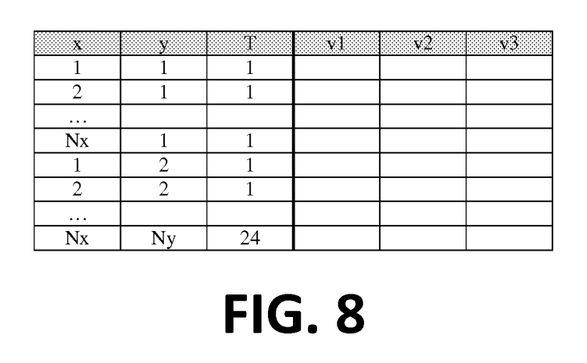

The raster-based representation may be a multidimensional matrix representation with an (x,y,z,t)-index together with occurrence information about pre-defined attributes F that occur in a given space-time cell. Space and time can be partitioned according to a sampling in line with the given application. In a first example, as shown in FIG. 5, a multidimensional matrix representation M is used. The multidimensional matrix representation M comprises a uniform x and y spacing and is collecting simple occurrence as attribute. The z-dimension is not used. The time dimension t is being collapsed. This example can then be visualised as an integer raster, as shown in FIG. 6. In another example, the representation is a multidimensional matrix M, with a uniform x and y spacing, collecting speed occurrence in three speed intervals v1, v2 and v3 as attributes. The latter is shown in FIG. 7. Again, the z-dimension is not used and the time dimension t is being collapsed. This example can be visualised as an integer three-band raster which after normalisation can be visualised as a RGB-image. In still another example of a multidimensional matrix representation M, a uniform x and y spacing with a time spacing of one hour over a day is used, collecting speed occurrence in three speed intervals v1, v2 and v3 as attributes. The latter is illustrated in FIG. 8. This example cannot be visualised in a single RGB-image but would be analogue to a multispectral image where each spectral band represents a time band. Other examples are possible by extending the space-time partitioning and/or adding attributes. In the full space (x,y,z,t), this can only be visualized by projecting on a given dimension. For processing the multidimensional space-time matrix, this is not necessary.

According to embodiments, in order to conserve memory space, the index may but does not need to be stored explicitly as long as the inherent topological structure of the data is known. For example, for a matrix representation as shown in FIG. 5 and FIG. 6 the (x,y) index can be inherently understood by storing the multidimensional space-time matrix as an integer raster. Using the space-time structure of the data structure, querying the raster-based represented data can be reduced to indexing which is a fast process compared to for example spatial search as in traditional vector geographical information systems.

It is an advantage of embodiments according to the present invention that a raster-based data structure comprising the probe information may allow efficient processing, e.g. especially when the original vector-based data is representative of a plurality of tracks of a multiple of location aware devices. It is an advantage of embodiments according to the present invention that these involve processing of the data using a raster-based representation, as the latter inherently encodes a spatial neighbourhood knowledge. This is not the case when processing of data in a vector representation is performed for deriving geo-information. Vector-based information is a compact representation for linear networks such as for example properties for a road segment encoded only once per segment. As vector-based information does not encode a spatial neighbourhood knowledge, it has the disadvantage that querying a database of line segments needs to be performed by first spatially matching corresponding line segments based on proximity and overlay, whilst this is overcome when using raster-based representation. It is an advantage of embodiments according to the present invention that neighbourhood query operations, which are processor intensive, can be avoided resulting in a more efficient system, especially in a context where a large number of probe signals needs to be processed, thus avoiding a processing bottleneck.

According to some embodiments, the data-processor furthermore may be adapted for deriving geo-information based on the raster-based data structure comprising the data provided by the at least one location aware device, e.g. using a deriving means 130. The data processor 120 may be adapted for deriving traffic related geo-information. The traffic related geo-information may for example comprise a position of a road, a centerline of a road, a number of drive lanes, a maximum speed, a variable maximum speed, spots where a traffic jam often occurs, detection of new roads, detection of road works, detection of changed traffic rules etc. The information may be obtained in real-time or with only a slight delay. The latter may be especially suitable for use in dynamic global positioning systems, whereby traffic control information can be provided to the location aware system as feedback, allowing to avoid e.g. traffic jams. Some examples of deriving geo-information are discussed by way of illustration below, such as examples of creation of new geo-information, examples of matching between geo-information of different location aware devices or between geo-information from a location aware device with an existing database, examples of advanced features for data-mining and an example of using machine learning.

Figure 9:
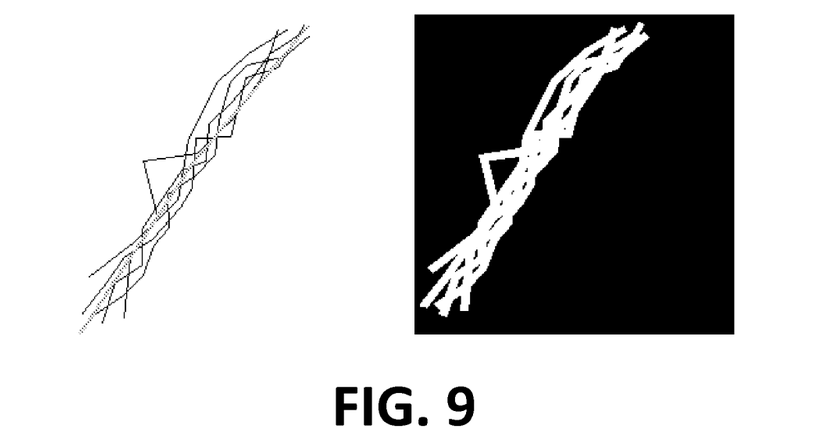
FIG. 9 is an illustration of a set of probe tracks and source data in overlay, represented in their original vector format (left) and in a binary space-time raster-based representation (right), as can be obtained using a method according to an embodiment of the present invention.
Figure 10:
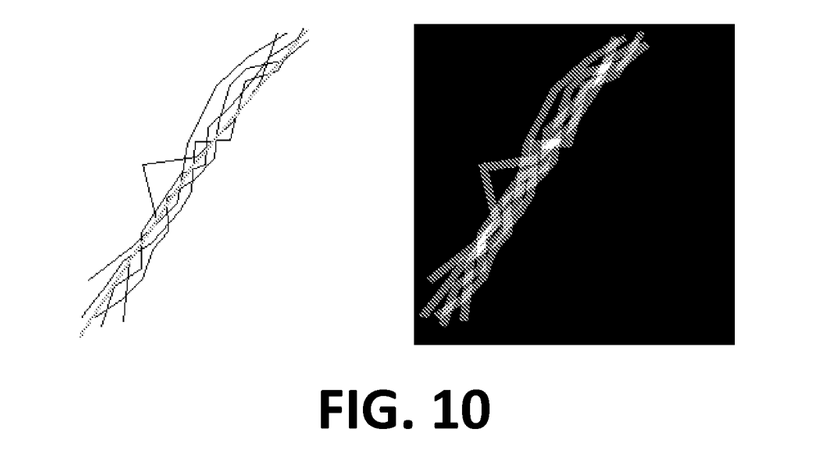
FIG. 10 is an illustration of a set of probe tracks and source data in overlay, represented in their original vector format (left) and in an integer space-time raster-based representation (right), as can be obtained using a method according to an embodiment of the present invention.

In one set of examples, processing of the raster-based information allowing deriving geo-information such as for example a new geometry like an adjusted position of a center line of a road or an identification of the presence of a new road is illustrated. Such a new geo-information may be based on a plurality of collected tracks, collected from different location aware devices. The underlying raster structure of the representation can naturally impose a spatial clustering of tracks. This can preempt the neighborhood search process which would need to be performed when using a vector representation. Neighborhood search is a processor intensive process in vector GIS and can become a limiting factor if the number of traces and/or sample density is significant. Exploiting the inherent spatial clustering of a raster based representation may allow new geo-information such as for example a new geometry to be derived. In one simple example, the geo-information may be derived by reducing the raster-based data structure to a binary 2D matrix on which different tracks, e.g. GPS traces, are plotted. An example thereof is shown in FIG. 9. On the left hand side, a set of probe tracks and source data are shown in overlay represented in their original vector format whereas on the right hand side a representation of this data inserted in a raster-based data structure being a binary space-time raster-based data structure is shown. Due to the binary form, occurences are reduced to 0/1. Positional accuracy can be taken into account as explained above. The resulting binary 2D MST matrix can be used for deriving geo-information such as for example a road centerline by performing for example image filter operations. An example of such image filtering that may be used is mathematical morphology (MM), which deals with analysing and processing of geometrical structures in digital images. Opening and closing MM operations can be used to close small holes between overlapping probe traces and to form one connected binary segment. Medial axis transform (MAT) can be used to calculate the skeleton of the binary segment. This skeleton then may be considered an approximation of the road centerline. The skeleton can be further pruned to remove small outlier segments which can occur with MAT. In another example, a raster-based representation is used, wherein a number of occurrence is used as attribute feature. The present example, as shown in FIG. 10, illustrates a 2 dimensional representation with collapsed time dimension, which can also be represented by an integer 2 dimensional multidimensional space-time matrix. At the left hand side, a set of probe tracks and source data in overlay is represented in their original vector format, whereas at the right hand side the corresponding raster-based data structure is represented as an integer space-time raster-based representation. After normalization, image filter techniques from greyscale image processing like greyscale MM or ridge detection can be applied to derive new geometry. The greyscale in this case naturally encodes the probability of occurrence that a given MST-cell belongs to road geometry. By applying image filter techniques on MST, the probability of occurrence as well as the spatial clustering may be exploited. For example, the road centerline can again be calculated using greyscale MM processing. This will take into account clusters of probable cells and the centerline can be "drawn" by these clusters. It is an inherent feature of raster-based representations that occurrence probability of a cell and the spatial clustering can be treated simultaneously by the geometry detection processes. In still another example of generation of new geo-information, colour or multispectral filter processing may be used to derive new geo-information such as for example new geometries.

Figure 11:
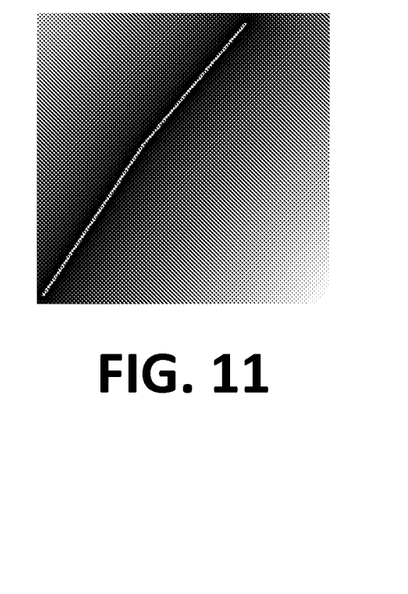
FIG. 11 illustrates an example of the effect of applying a distance transform algorithm on raster-based geo-information as may be performed while performing a method according to an embodiment of the present invention.

In another set of examples, deriving geo-information may comprise matching the data obtained from the at least one location aware device with geo-information obtained from other location aware device or matching it with existing geo-information, such as for example present in a road database, for checking, controlling and optionally adjusting, updating or extending existing geo-information. Again the inherent space or space-time structure of a raster-based representation preempts the query search mechanism of vector GIS. As raster-based data structure is used, other type of operations can be applied, resulting in an efficient processing. For example, an operation like distance transform, as exists in MM, is a representation of a digital image, where the transform supplies each pixel of the image with the distance to the nearest object pixel. FIG. 11 illustrates an raster-based representation, in the present case being an image, after a distance transform algorithm has been applied. Fast implementations of such distance transformations exist. If for example several roads are present, the transformation may automatically calculate the distance to the closest road pixel. It may serve as a match to a particular road segment as well as specific position on that road segment, for example by searching for road segments at the distance reported by the distance transform. To be able to use an operation like distance transform on a raster-based representation such as for example a multidimensional space time matrix, the typical 2D kernels used in MM may be extended to 4D if serving the full space-time dimension (x,y,z,t). The result of the distance transform of the raster-based representation is in itself again a raster-based representation. In one example, matching of location aware device with one another or with existing geometry is performed by representing them as raster-based representation with comparable elements, e.g. as multidimensional space-time matrices with comparable space-time cells. This can solve the problem of difference in scale, representation, generalization and/or sampling frequency that makes the matching of location aware devices with one another or with existing geometry a difficult task. In practice, the raster-based representation distance transform of the reference may be calculated and a location index of each candidate element may be used to quickly index the raster-based representation distance transform. Note that to match location aware devices, such as GPS probes, to existing geometry, it is sufficient to calculate the distance transform of the reference only once. This is an important benefit if the number of GPS probes becomes significant.

In still another set of examples, advanced features for data mining are illustrated as possibilities within the process of deriving geo-information. The raster-based representation can be used to efficiently calculate advanced features on a collected location aware devices dataset. In a first example, starting from a raster-based representation of existing geometry like a road database, for each raster-based-cell of a road segment, a line vector-to-raster operation like Bregenham can be used to calculate a cross-section index of given length. This index augmented with the appropriate time index can be used to quickly collect occurrence distributions of features perpendicular to the direction of the road to assess a road attribute like number of lanes. In another example, in addition to occurrence distributions, co-occurrence distributions can be collected. A co-occurrence distribution measures the occurrence of a given feature in conjunction with the occurrence of another feature, not necessarily of the same object. Whereas for vector geographic information systems such processing would be very processor intensive, this is significantly less processing-capacity-demanding when transformation has been performed to a raster-based representation. If all data is transformed into a raster-based representation with comparable elements, collecting co-occurrence statistics can thus be performed in an efficient way. An example of co-occurrence statistics or processing is the analysis of co-occurrence behaviour of number of occurrence in neighbouring space-time cells for a highway in a small time partition. A significant measurement of this co-occurrence indicates that more than one vehicle track is observed at a given time in the direction of the co-occurrence. The number of lanes can be deduced from this feature, especially when analysing roads in a raster-based time partition where heavy traffic occurs (e.g. peak traffic moments in the morning or evening).

In yet another example, deriving geo-information also may include using machine learning. Unsupervised and supervised machine learning techniques like neural networks (NN) or reservoir computing (RC) can be applied using the raster-based representation. The element uniformity of the raster-based representation as well as the fact of representing all data with comparable elements, results in a natural representation for applying techniques like NN or RC. These techniques take training data, where ground truth data about road attributes are used to train NN or RC. NN or RC networks can work directly on the vector-based representation, such as for example on multi-dimensional space-time matrices, or on derived features from the vector-based representation, such as for example multi-dimensional space-time matrices.

The above examples illustrate some of the processes that may be used for deriving geo-information, embodiments of the present invention not being limited thereto. Different techniques identified in different examples may be combined.

The system furthermore may also comprise an output means 140 for outputting the raster-based structure to a database. The latter may allow storing the raster-based data structure in a database and retrieving this data structure afterwards. It thereby is an advantage that the raster-based data structure can comprise the necessary information obtained from the location aware devices, so that it is not required anymore to store the vector-based data—although this may be performed.

As indicated above, the processor may be a distributed processor whereby it comprises different processing components at least part of these processing components being present on the location aware devices. The input means then may correspondingly be distributed on the location aware devices.

By way of illustration, the present invention not being limited thereto, a number of particular embodiments are provided, illustrating advantages and features of the system and method as described above, as well as illustrating further optional features and additional advantages as can be obtained by some embodiments of the present invention.

Figure 12:
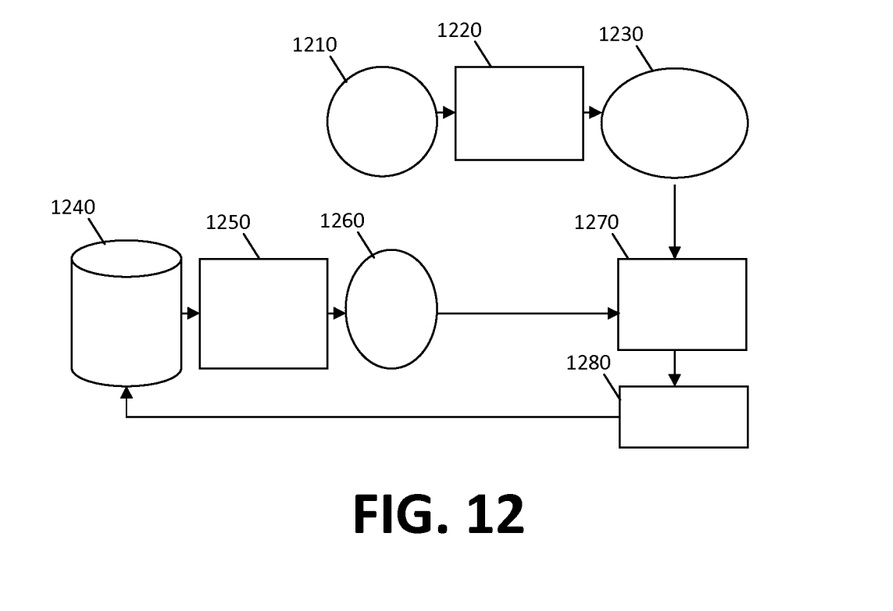
FIG. 12 illustrates an example of a process flow in a system for updating GIS geometry, according to an embodiment of the present invention.
Figure 13:
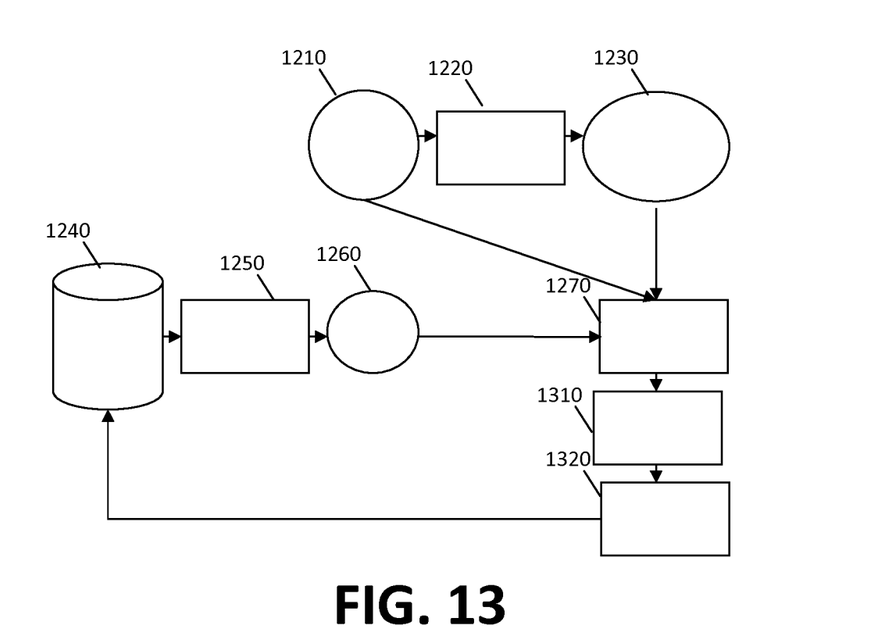
FIG. 13 illustrates an example of a process flow in a system for updating GIS geometry and to extend GIS attributes, according to an embodiment of the present invention.

In one particular embodiment, the present invention relates to a method and/or system adapted for operating as set out above, but wherein the method and system is adapted for updating the geographic information system. In this embodiment, new geo-information such as for example a new geometry is generated for the geographic information system (GIS) based on the raster-based representation, e.g. matrix space-time representation, of collected data of a plurality of location aware devices, such as for example global positioning systems. By way of illustration, an example of a flowchart is shown in FIG. 12, expressing the steps of a method according to the present embodiment and/or expressing the functions as can be performed by components of a system according to the present embodiment. The flowchart takes as input the raster-based data 1210 as determined based on information from vector-based data received from one or more location aware devices. Geo-information 1230 then is derived from the raster-based data structure 1210 using a processing operator 1220. The obtained geo-information 1230 is matched with the geometry of an existing GIS database, using a raster-based representation of the GIS 1260 such as for example a multi-dimensional space-time representation. Such raster-based representation of the GIS 1260 is obtained via a conversion operator 1250 converting a conventional representation of the GIS 1240. Such a conversion of the GIS database towards a raster-based representation of data in the database allows efficient comparison. The matching may be performed according to a matching operator 1270 as described by way of example above. After matching has been performed the geographic information system may be checked for inconsistencies or for extensions and the database may be updated with matched new geo-information using an new geo-information updating operator 1280, so that an improved database can be obtained. FIG. 13 illustrates the situation whereby additional attributes are provided by the location aware devices, e.g. not previously present in the database. The latter may be performed by an additional operator 1310 for matching the additional attributes to the raster-based representation of the GIS and with an operator 1320 for updating and extending with new geo-information and new attributes. This does not imply a significant additional cost as for example, when using indexing, the same index can be used. The same flowchart can be used for incorporating additional attributes which are calculated based on the data obtained from the at least one location aware device.

Figure 14:
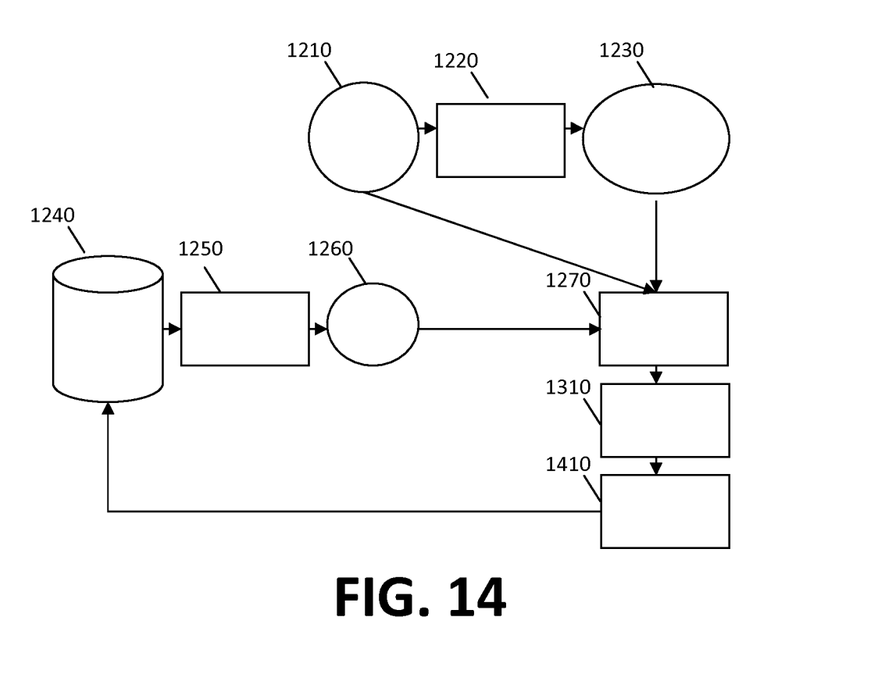
FIG. 14 illustrates an example of a process flow in a system for updating GIS geometry and to extend GIS attributes using machine learning, according to an embodiment of the present invention.

FIG. 14 illustrates a flow diagram for flow of data in a process for updating and/or extending a GIS database, using a machine learning operator 1410. The machine learning process thereby may be trained off-line using a ground truth dataset. It is an advantage of such a system that the dataset can evolve dynamically.

Figure 15:
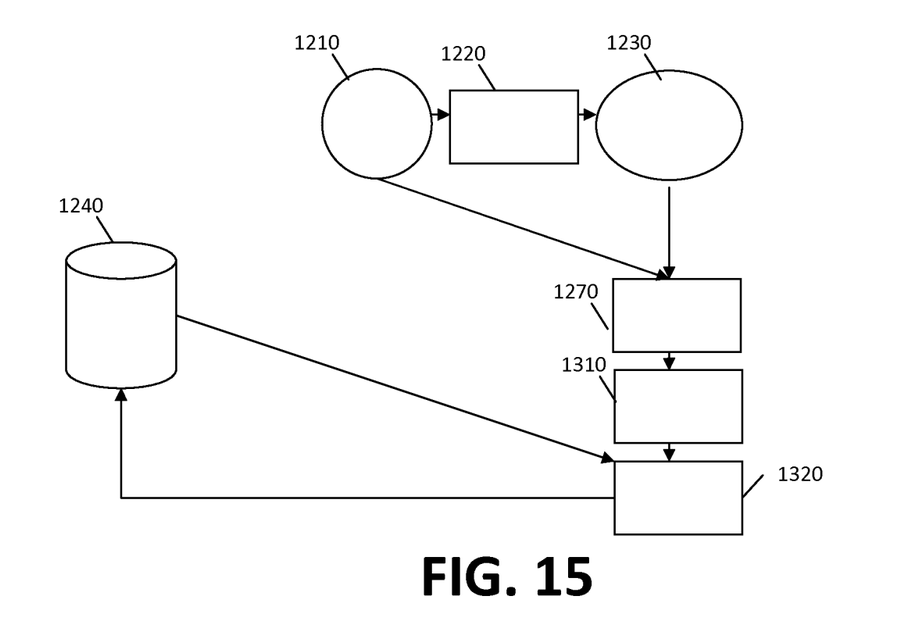
FIG. 15 illustrates an example of a process flow in a system for updating GIS geometry and for extending GIS attributes, wherein direct updating of an existing GIS database is performed without matching the probe data with a representation of the GIS database first, according to an embodiment of the present invention.

In FIG. 15, an exemplary flow diagram for flow of data in a process for updating and/or extending a GIS database is shown whereby GIS geometry can be updated and GIS attributes can be extended without matching probe data to the existing GIS database. The raster-based representation for the new geometry or attributes may be used directly for updating the existing GIS database, i.e. without need for obtaining a raster-based representation of the GIS database. An example of such updating or extending operator may be an operator applying an extended Bregenham-like operator for querying the underlying raster-based representation of the new geometry or attributes with the vector lines of the GIS database.

In a second aspect, the present invention also relates to a method for processing data of at least one location aware device for obtaining geo-information. The method comprises the step of obtaining vector-based data from at least one location aware device. The latter may for example be receiving such information in a processing system or also may include capturing such information. Alternatively, obtaining vector-based data also may include receiving such information from a memory, i.e. receiving historically captured information. The method furthermore comprises the step of processing the data by inserting obtained information of vector-based data into a raster-based data structure so as to derive geo-information based on the raster-based data structure. In one embodiment, such processing may comprise indexing a location component of the vector-based data, i.e. the part of the data expressing the spatial location of the data. In some embodiments, when a time component is available in the data, also this time component may be included in the indexing. In one embodiment, the processing furthermore may comprise updating one or more elements of a raster based representation of data based on the obtained index. The elements thereby correspond with topologically arranged positions in the scene of which geo-information is to be derived. The elements themselves also may be topologically arranged elements. In one embodiment, processing optionally also may comprise, if several attributes are provided by the location aware device at the same location or at the same time and location, updating selected topologically arranged elements for each of the attributes, based on the same index. Method embodiments furthermore may comprise deriving geo-information based on the raster-based data structure. Furthermore, method embodiments also optionally may comprise the functionality of one or more components of the system as described in the first aspect and therefore the method may induce similar advantages as set out in the first aspect.

In another aspect, the present invention relates to a location aware device such as a mobile phone, which is adapted for preprocessing vector data at the location aware device into raster-based data and for submitting raster-based data. Such embodiments will allow distributed processing, i.e. part of the processing occurs at the level of the location aware devices where conversion between vector-based data and raster-based data is at least partly performed, and part of the processing occurs at the level of a global processor, e.g. on a server, to which the local raster-based data is transmitted. In another aspect, the present invention also relates to a computer program product or a computer application, run on the location aware device comprising the instructions for performing a method of pre-processing the data on the location aware device by transforming vector-based data into local raster-based data and by submitting the local raster-based data to a global processor, e.g. on a server. By way of illustration, further features and/or advantages of some embodiments according to the present aspect are illustrated in a particular example that is discussed later below.

In further aspects, embodiments of the present invention also relate to computer-implemented methods for performing the method for processing data for obtaining geo-information as indicated above or as can be obtained by the functionality of the system described above. Embodiments of the present invention also relate to corresponding computing program products. Such methods may be implemented in a computing system, such as for example a general purpose computer. The computing system may comprise an input means and a data processor, which may be set up as a single data processor or as a plurality of processors. The computing system may include a processor, a memory system including for example ROM or RAM, an output system such as for example a CD-rom or DVD drive or means for outputting information over a network. Conventional computer components such as for example a keyboard, display, pointing device, input and output ports, etc also may be included. Data transport may be provided based on data busses. The memory of the computing system may comprise a set of instructions, which, when implemented on the computing system, result in implementation of the standard steps of the method as set out above and optionally of the optional steps as set out above. Therefore, a computing system including instructions for implementing the method of processing data for obtaining geo-information is not part of the prior art.

Further aspect of embodiments of the present invention encompass computer program products embodied in a carrier medium carrying machine readable code for execution on a computing device, the computer program products as such as well as the data carrier such as dvd or cd-rom or memory device. Aspects of embodiments furthermore encompass the transmitting of a computer program product over a network, such as for example a local network or a wide area network, as well as the transmission signals corresponding therewith.

Some features and advantages will further be illustrated by way of following examples, embodiments of the present invention not being limited thereby. According to some embodiments of the present invention, the raster-based datastructure may represent an underlying space-time structure (X,Y,Z,T) and may be built up as explicit raster-based space-time structure (X,Y,Z,T) or as an implicit raster-based structure that can be transformed in a more explicit space-time structure. The use of an implicit raster-based structure may for example be especially advantageous for location aware devices that do not generate explicit location data. A cell phone as such sometimes has no positioning sensor on-board. It is known that by using the available raw cell data can be processed to generate location using geolocation techniques like time-difference-of-arrival (TDOA). TDOA uses triangulation in line-of-sight environments. By combining the signal strength of the main and neighbouring cell towers and the known position of the cell towers, the location of the mobile device can be calculated. For the line-of-sight environment error bounds for positioning accuracy have been developed and can be taken into account in the data integration stage. In a non-line-of-sight environment, position accuracy is known to be degraded.

Signature matching approaches have been developed to further enhance the accuracy. For this, a set of probe phones are used to calibrate the system with a database of signatures for certain key locations like shopping streets. These signatures consist out of the cell id's of the cell towers and corresponding signal strength at a given location. An unknown signature is then matched with these probe signatures to estimate its position based on the calibrated data. The raster representation is suited to heterogeneously process raw cell phone data and location data. Instead of converting the raw cell phone data into location data and processing it further, the raw cell phone data can be stored directly into the raster representation. For this, the raster is built as (Cell ID1 signal, Cell ID2 signal, . . . , Cell ID3 signal, T). A Cell ID dimension therefore represents the signal strength that the mobile device receives at a given time. Mark that in this way, location tracks are not encoded explicitly but implicitly and frequencies of occurrence, speed, orientation are stored on this implicit raster.

Figure 16:
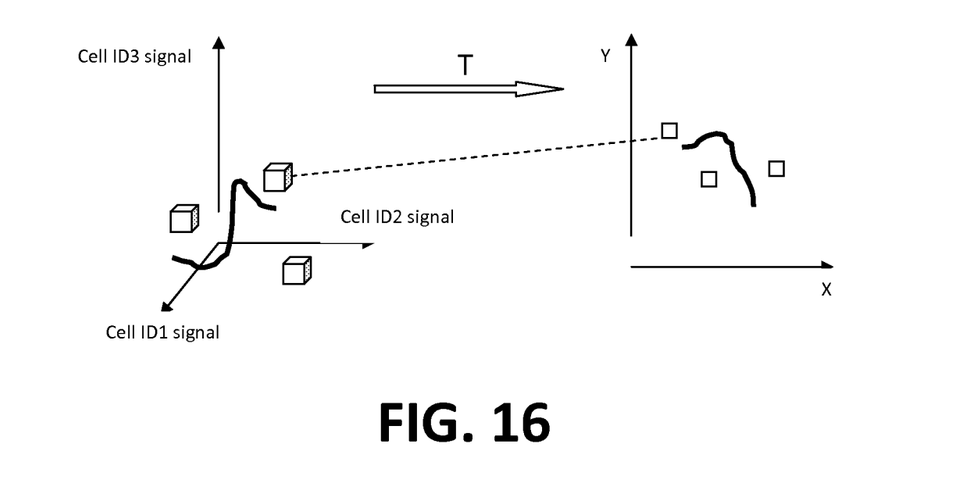
FIG. 16 illustrates how an implicit raster representation can be used and matched to an explicit raster representation, according to an embodiment of the present invention.

Transformation into location information can be done in two ways. In a first way, using techniques like TDOA, each bin (Cell ID1 signal, Cell ID2 signal, . . . , Cell ID3 signal, T) of the implicit raster can be transformed into an explicit location bin (X,Y,Z,T). Alternatively, using probe devices, a dual implicit and explicit raster representation can be generated. This is a linked representation, where a number of bins of the implicit raster representation are directly linked to bins of the explicit representation due to the dual measurement of the probe device. Using linear or non-linear raster transformations, a mapping can be calculated from one representation to the other. This allows a mapping of the processed cumulated cell phone data into location. Vice versa, it allows the mapping of reference vector data (e.g. road database) into the implicit representation. The advantage of mapping reference data into the implicit representation is that accuracy can be better controlled as the reference is usually more sparse as it represents a generalization of reality. Therefore, probe data can be chosen to guarantee a good mapping of the reference data (e.g. probing the center of a road). The raw cell phone data remains in its original representation so as to assure no information loss. Because the reference data retains its semantic meaning, spatial mining of the cell phone data can still be performed. E.g. once a street is mapped into the implicit representation, mean number of mobile devices per day on this street can be calculated without having to transform the signatures into location. By way of illustration, a transformation T between an implicit raster-based representation and an explicit raster-based representation is illustrated in FIG. 16.

In a second example, an illustration is given of distributed processing that can be performed using a mobile location aware device, such as for example a mobile phone. Using a local version of at least part of the data processor, installed on a location aware device, the vector-based location data can be preprocessed into a raster-based data and advantageously as a raster-based index. The local raster-based indices can be grouped into encoded and/or compressed packets to further improve the communication. In this way, such a dataflow could be used for example to transform a GPS-location in a mobile device into a more compact index. Instead of transmitting an (X,Y,Z)-coordinate, which in WGS84 would be encoded by three double numbers or 24 bytes, more compact data would be available for use. If the area of interest would be a shopping area of 1 sq.km, sampled with a 1 m accuracy, this would give a base (X,Y) raster of 1M bins. In this case, a 3 byte index would suffice to index into this raster. As WGS84 is meant to map the whole earth, the reduction becomes more pronounced when specific zones of interest for gathering statistics are defined like malls, shopping areas, mobility around schools and public transport. The indexing can be done in a hierarchical manner, where the local processor can create a combined index indicating a specific geographical zone (e.g. a school) with a more detailed raster index within this zone. In another example, the index can be based on raw cell phone data instead of location data.

Figure 17:
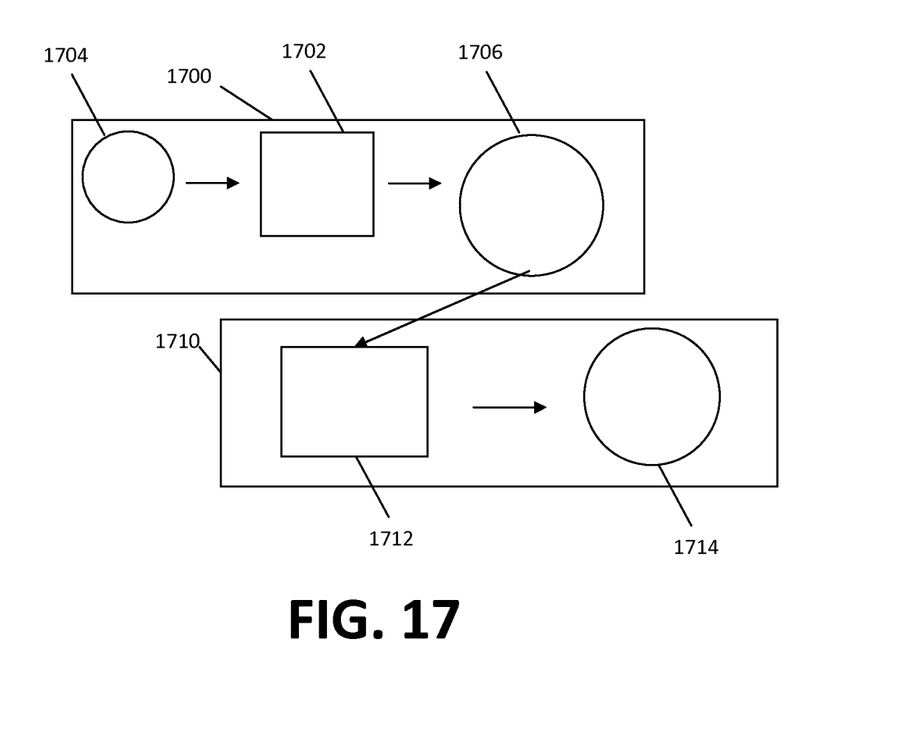
FIG. 17 illustrates an example of how distributed processing, partly on the location aware device, partly on a central processor can be used, according to an embodiment of the present invention.

If the location aware device has sufficient processing and memory capacity (e.g. smartphone, laptop), a local raster representation can be stored on the device itself, which is updated by the local data processor. This local representation can be transmitted to the global data processor in an off-line fashion, e.g. when the mobile device enters in a wifi-enabled area. This reduces power and bandwidth consumption at the client side as the offline communication can be performed under more optimal conditions. The local raster representation can be transmitted under compressed form to further speed up the offline communication. FIG. 17 illustrates an example of a system wherein distributed processing is performed. Part of the processing is performed by a processing component 1702 on a location aware device 1700, processing sensor data 1704 into local raster-based data 1706, which may be in a space-time representation, an index representation, an implicit representation, etc. The local raster-based data 1706 may be continuously or discontinuously, e.g. in batch, sent to a global processing component 1712, e.g. on a server 1710, collecting different local raster-based data 1706 into global raster-based data 1714.

The above example illustrates the possibilities of distributed processing that can be performed in embodiments of the present invention.

The invention claimed is:

1. A system for processing data of a plurality of location aware devices for obtaining geo-information, the system comprising:
   an input means for obtaining a plurality of vector-based data from the plurality of location aware devices,
   a data processor configured, by a set of instructions stored in a memory, to insert information from the plurality of vector-based data into a raster-based data structure comprising a plurality of data container elements corresponding with topologically arranged locations,
   the data processor comprising a data voting unit configured to add the information from the vector-based data individually to one or more selected data container elements with the data processor also being configured to derive geo-information based on the raster-based data structure and the information from the plurality of vector-based data inserted therein,
   wherein the data processor is arranged to derive geo-information based on a coupling between the content of data container elements corresponding with topologically arranged neighboring locations, and
   wherein the system furthermore comprises an output means for outputting the raster-based data structure for storage to a database.

2. The system according to claim 1, wherein the data processor is arranged to update a counter of the selected data container elements based on the information from the vector-based data.

3. The system according to claim 1, wherein the data processor is arranged to update the raster-based data structure incrementally with the information from the vector-based data.

4. The system according to claim 1, wherein the data processor comprises an indexing means that indexes a spatial location component of the vector-based data.

5. The system according to claim 1, wherein data processor is arranged to insert the information of the vector-based data into the raster-based data structure taking into account the obtained index of said spatial location component.

6. The system according to claim 1, wherein the system is arranged to obtain traffic and/or road related geo-information, the geo-information being information that refers to or is linked to location and/or wherein the system is arranged to receive data from a plurality of location aware devices.

7. The system according to claim 1, wherein the data processor is arranged to insert the vector-based data into an implicit or explicit space-time matrix data structure.

8. The system according to claim 1, wherein the data processor comprises a deriving means for deriving geo-information based on the raster-based data structure, for deriving geo-information comprising a new road geometry and/or in which the deriving means comprises a neural network or reservoir computing unit or a unit for performing data-mining for deriving said geo-information.

9. The system according to claim 1, wherein the data processor is arranged to derive occurrence for deriving traffic and/or road related information based on the raster-based representation and/or to derive co-occurrence attributes for deriving traffic and/or road related information based on the raster-based representation.

10. The system according to claim 1, wherein the input means is arranged to receive data comprising a location component and at least two attributes, and the data processor is adapted to derive geo-information based on the at least two attributes using a same location component of the raster-based data structure.

11. The system according to claim 1, wherein the system furthermore comprises a matching unit for matching the obtained geo-information to vector-based data of an existing geo-database or to a raster-based representation of said vector-based data in the existing geo-database.

12. The system according to claim 1, wherein the system furthermore comprises a matching unit for matching the obtained geo-information between a plurality of location aware devices.

13. The system according to claim 1, wherein the system is arranged to update and/or extend the existing geo-database.

14. The system according to claim 1, wherein the processor comprises at least one processing component implemented on the location aware device, the at least one processing component being arranged to process the vector-based location data into raster-based data.

15. A method for processing data of a plurality of location aware devices for obtaining geo-information, the method comprising:
   obtaining a plurality of vector-based data from the plurality of location aware devices,
   processing said data by inserting information of the plurality of vector-based data into a raster-based data structure comprising a plurality of data container elements corresponding with topologically arranged locations so as to add, using a data voting unit, the information from the vector-based data individually to one or more selected data container elements and so as to derive geo-information based on the raster-based data structure and the information from the plurality of vector-based data inserted therein, and
   outputting the raster-based data structure for storage to a database,
   wherein processing said data is arranged to derive geo-information based on a coupling between the content of data container elements corresponding with topologically arranged neighboring locations.

16. The method according to claim 15, the method being implemented as a computer program product, the method being performed when the computer program product is executed on a computing device.

17. A computer program product for executing on a location device, the computer program being programmed to, when executed on the location aware device and embodied in a non-transitory storage medium carrying, process vector-based data into raster-based data on the location aware device, and submit the raster-based data for insertion into a raster-based data structure comprising a plurality of data container elements corresponding with topologically arranged locations using for the insertion a data processor comprising a data voting unit configured to add the information from the vector-based data individually to one or more selected data container elements and for deriving geo-information based on the raster-based data structure and the information from the plurality of vector-based data inserted therein, and outputting the raster-based data structure for storage to a database, wherein the data processor is arranged to derive geo-information based on a coupling between the content of data container elements corresponding with topologically arranged neighboring locations.

18. A computer program product according to claim 17, wherein the raster-based data comprises a raster-based index or wherein the raster-based data is compressed raster-based data.

* * * * *